(12) United States Patent
Peselli

(10) Patent No.: US 9,505,478 B2
(45) Date of Patent: Nov. 29, 2016

(54) UNDERWATER VEHICLE PROVIDED WITH HEAT EXCHANGER

(71) Applicant: WHITEHEAD SISTEMI SUBACQUEI S.p.A., Rome (IT)

(72) Inventor: Mauro Peselli, Carrara (IT)

(73) Assignee: WHITEHEAD SISTEMI SUBACQUEI S.P.A., Rome (IT)

( * ) Notice: Subject to any disclaimer, the term of this patent is extended or adjusted under 35 U.S.C. 154(b) by 0 days.

(21) Appl. No.: 14/596,935

(22) Filed: Jan. 14, 2015

(65) Prior Publication Data

US 2015/0197326 A1    Jul. 16, 2015

(30) Foreign Application Priority Data

Jan. 15, 2014 (IT) .............................. TO2014A0020

(51) Int. Cl.
| | |
|---|---|
| B63H 21/38 | (2006.01) |
| F42B 19/12 | (2006.01) |
| B63H 21/00 | (2006.01) |
| B63G 8/08 | (2006.01) |
| H01M 10/625 | (2014.01) |
| H01M 10/66 | (2014.01) |

(Continued)

(52) U.S. Cl.
CPC .............. B63H 21/383 (2013.01); B63G 8/08 (2013.01); B63G 8/36 (2013.01); B63H 21/00 (2013.01); F42B 19/12 (2013.01); H01M 2/1083 (2013.01); H01M 10/625 (2015.04); H01M 10/66 (2015.04); B63G 2008/002 (2013.01); B63H 2021/003 (2013.01); H01M 2220/20 (2013.01)

(58) Field of Classification Search
CPC .............................. B63H 21/38; B63H 21/383
USPC .................................................. 114/334, 337
See application file for complete search history.

(56) References Cited

U.S. PATENT DOCUMENTS 2,658,143 A * 11/1953 Fiet ...................... H01Q 21/205
                                                            333/33
3,911,441 A * 10/1975 Stein ...................... H01Q 21/28
                                                            343/709

(Continued)

FOREIGN PATENT DOCUMENTS

DE       3836583       5/1990
EP       0909002       4/1999

(Continued)

OTHER PUBLICATIONS

Italian Search Report dated Aug. 19, 2014 corresponding to Italian Application No. TO20140020; 7 pages.

Primary Examiner — Lars A Olson
Assistant Examiner — Jovon Hayes
(74) Attorney, Agent, or Firm — Ohlandt, Greeley, Ruggiero & Perle, LLP

(57) ABSTRACT

An electric battery for the propulsion of vehicles in an underwater environment, comprising a cylindrical tubular casing defining a main chamber housing an anhydrous electrolyte; intake members to transfer a flow of water from the marine environment to the main chamber, to form, following execution of a water-intake command, a liquid electrolyte; a plurality of electrochemical cells housed in the tubular casing; a heat exchanger receiving as input electrolyte taken from the main chamber and an outlet communicating with an inlet of the electrochemical cells. The heat exchanger is provided in the cylindrical tubular portion and comprises at least one channel made in an inner wall of the cylindrical tubular portion, and extending along a helical path coaxial to the axis of the tubular portion.

12 Claims, 4 Drawing Sheets

(51) Int. Cl.
*H01M 2/10* (2006.01)
*B63G 8/36* (2006.01)
*B63G 8/00* (2006.01)

(56) References Cited

U.S. PATENT DOCUMENTS 5,684,493 A * 11/1997 Floyd ...................... H01Q 1/34
343/709

8,698,691 B2 * 4/2014 Chen ...................... H01Q 1/002
165/104.33
2015/0197326 A1 * 7/2015 Peselli ................. B63H 21/383
114/337

FOREIGN PATENT DOCUMENTS

EP 1010614 6/2000
WO 2005053068 6/2005

* cited by examiner

UNDERWATER VEHICLE PROVIDED WITH HEAT EXCHANGER

The present invention relates to an underwater vehicle provided with a heat exchanger.

BACKGROUND OF THE INVENTION

Generally, an underwater vehicle (for example, an Underwater Autonomous Vehicle (UAV), a torpedo, or a generic propulsion unit submerged in the sea) comprises a shaped casing elongated along an axis and designed to move in an underwater environment under the thrust of a propulsion system housed inside the casing and powered by an energy source that is also housed inside the casing.

Such underwater vehicles are provided with hydraulic circuits in which fluids flow that must be cooled during operation of the underwater vehicle.

For example, it the energy source were provided by an electrochemical battery, the fluid to be cooled would be the electrolyte used in the electrochemical process for the production of electrical energy.

In particular, electrochemical batteries (see patent application PCT WO2005/053068 for example) comprise:
- a main electric battery of the electrochemical type in which a casing defines a main chamber housing an anhydrous electrolyte (for example, sodium hydroxide) and is provided with members for the control led intake of a flow of water from the marine environment to form a liquid electrolyte, following execution of a water-intake command, and members to discharge emissions, typically gases, produced by the chemical reaction of the main battery, into the marine environment; the main chamber houses a system for recirculating the fluid electrolyte (using an electric pump) to a plurality of electrochemical cells housed in the main chamber;
- an auxiliary electric battery that can be activated by remote control to open the controlled intake members and power the electric pump so as effect the formation and recirculation of the electrolyte.

The recirculation system generally comprises a thermostatic mixing valve that allows adjusting the flow of the fluid electrolyte fed to the electrochemical cells in order to keep the temperature of the electrolyte equal to a target value. This thermostatic valve, generally three-way, has a first, inlet that receives electrolyte directly from the main chamber, a second inlet that communicates with the outlet of a heat exchanger to which electrolyte in the main chamber is fed, and an outlet communicating with an inlet of the electrochemical cells.

According to patent application PCT WO2005/053068, the heat exchanger is made from a short pipe arranged in contact with an internal face of the tubular wall of the casing formed by the body of the torpedo in such a way that part of the heat of the electrolyte can be exchanged with the seawater that surrounds the torpedo.

However, the heat exchange achieved by known devices is quite limited; for this reason, the temperature difference between the fluids fed to the first/second inlets of the thermostatic valve is also small. The low temperature difference that is achieved does not enable effective control of the temperature of the electrolyte, which can vary significantly from the target value in many operating conditions.

SUMMARY OF THE INVENTION

The object of the present invention is that of providing an underwater vehicle equipped with a heat exchanger that operates with high effectiveness.

The foregoing object is achieved by the present invention in so far as it relates to an underwater vehicle comprising: a shaped casing elongated in the axial direction and designed to move in an underwater environment under the thrust of propulsion means housed inside the casing and powered by power generator means also housed inside the casing, characterized in that the shaped casing comprises at least one tubular portion, in particular a cylindrical portion, having a structural function; said tubular portion being lapped externally by seawater;

said tubular portion defining at least one channel delimited by ribs that extend along a helical path coaxial to said axis; said channel extends along said helical path between a fluid inlet provided in close proximity to a first end of the tubular portion and as fluid outlet provided in close proximity to a second end of the tubular portion; said tubular portion forming a heat exchanger between the fluid that flows in said channel and the seawater that laps the outside of said tubular portion.

Preferably, said generator means comprise a battery provided in the tubular portion, comprising: a main chamber delimited by said tubular portion and housing an anhydrous electrolyte (NaOH); intake members to transfer a flow of water from the marine environment to the main chamber, to form, following execution of a water-intake command, a liquid electrolyte; a plurality of electrochemical cells housed in said main chamber; a fluid recirculation system wherein a thermostatic mining valve has a first inlet receiving the fluid electrolyte coming from the main chamber, a second inlet communicating with an outlet of said heat exchanger receiving electrolyte taken from the main chamber as input, and an outlet communicating with an inlet of the electrochemical cells.

BRIEF DESCRIPTION OF THE DRAWINGS

The invention will now be described with particular reference to the accompanying drawings, which represent a particular embodiment, in which.

DETAILED DESCRIPTION OF THE INVENTION

Figure 1:
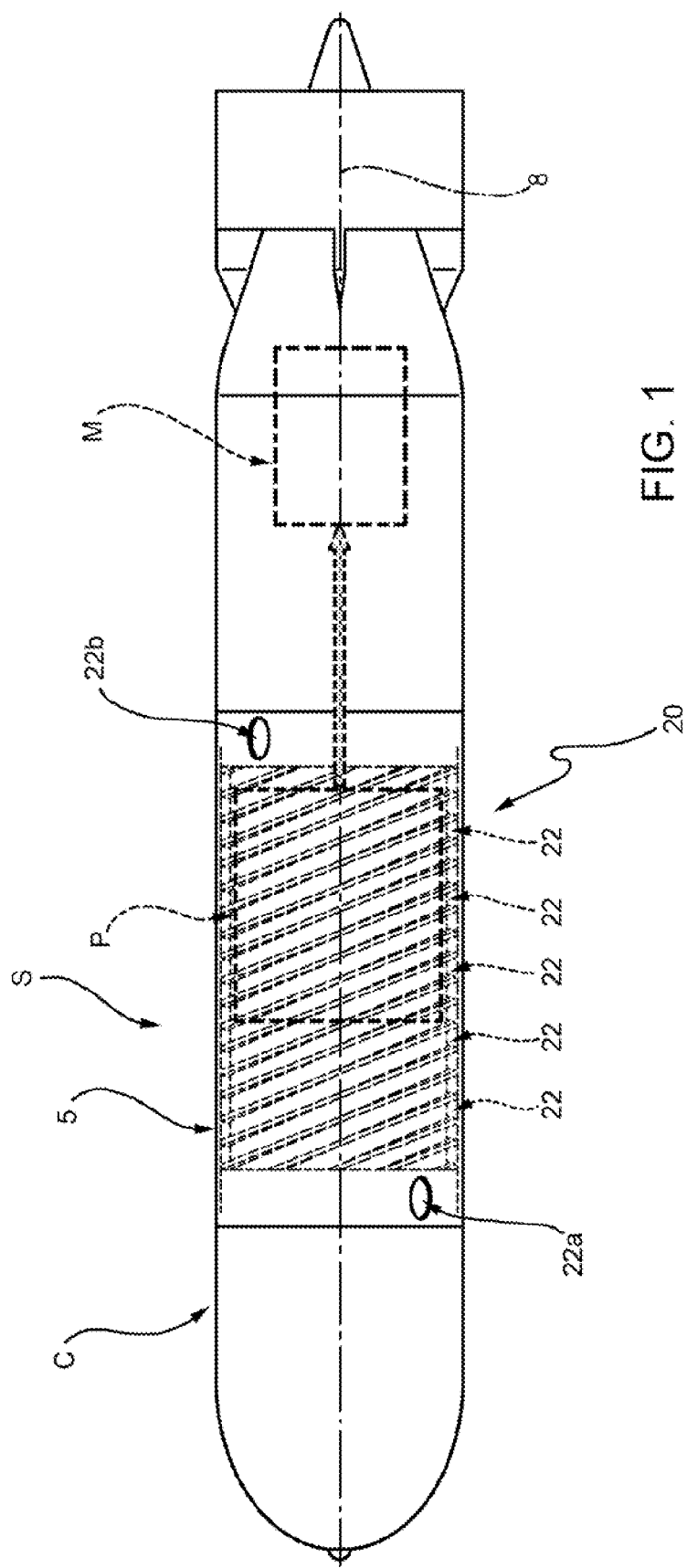
FIG. 1 schematically shows an underwater vehicle produced according to the principles of the present invention.

FIG. 1 schematically shows an underwater vehicle S (for example, an Underwater Autonomous Vehicle (UAV), a torpedo, or a generic propulsion unit submerged in the sea) comprising: a shaped casing C elongated along an axis 8 and designed to move in an underwater environment under the thrust of a propulsion system U housed inside the casing C and powered by a power generator P also housed inside the casing C.

As will be described in greater detail hereinafter, the shaped casing C comprises at least one portion 5 with axial symmetry, in particular a cylindrical tubular portion, having a structural function. The tubular portion 5 defines at least one channel 22 delimited by ribs that extend along a helical path coaxial to axis 8; the channel 22 extends along the helical path between a fluid inlet 22-a provided in close proximity to a first end of the tubular portion 5 and a fluid outlet 22-*b* provided in close proximity to a second end of the tubular portion 5. The tubular portion 5 thus forms a heat exchanger 20 between the fluid that flows in channel 22 and the seawater that laps the outside of the tubular portion 5.

The ribs are formed by ribbing that extends along respective helical paths; in this way, the ribs contribute to strengthening the tubular portion 5, replacing the closed rings that are usually used for strengthening the casing so that it can resist the stress caused by the pressure of the water that, in use, acts on the casing.

As is known, in a cylinder without reinforcement ribbing and closed at its ends, pressure produces compression stress on the casing having twice the intensity in a circumferential direction with respect to stress in the axial direction; it is therefore necessary to size the casing in such a way that it resists this circumferential/axial stress and avoids buckling.

A heat exchanger provided according to the invention has the following advantages:
i) the sea outside the casing C has practically infinite thermal capacity;
ii) during navigation by the underwater vehicle S, the external surface of the casing C is lapped by water at high speed, which significantly increases the related heat exchange coefficient;
iii) the water outside the casing is continually replaced at the speed of the underwater vehicle S;
iv) by making a casing with a material of high thermal conductivity (for example, using aluminium alloys that typically have conductivity in the range between 120 $W/(m \cdot °C)$ and 200 $W/(m \cdot °C)$) the thermal resistance of the intermediate element is reduced.

The fluid fed to the channel 22 can be a fluid used for cooling parts of the underwater vehicle (for example, the windings of the motor M) or an electrolyte used in the electrochemical process of energy generation, an example to which the present invention makes reference, but without any loss of generality.

Figure 2:
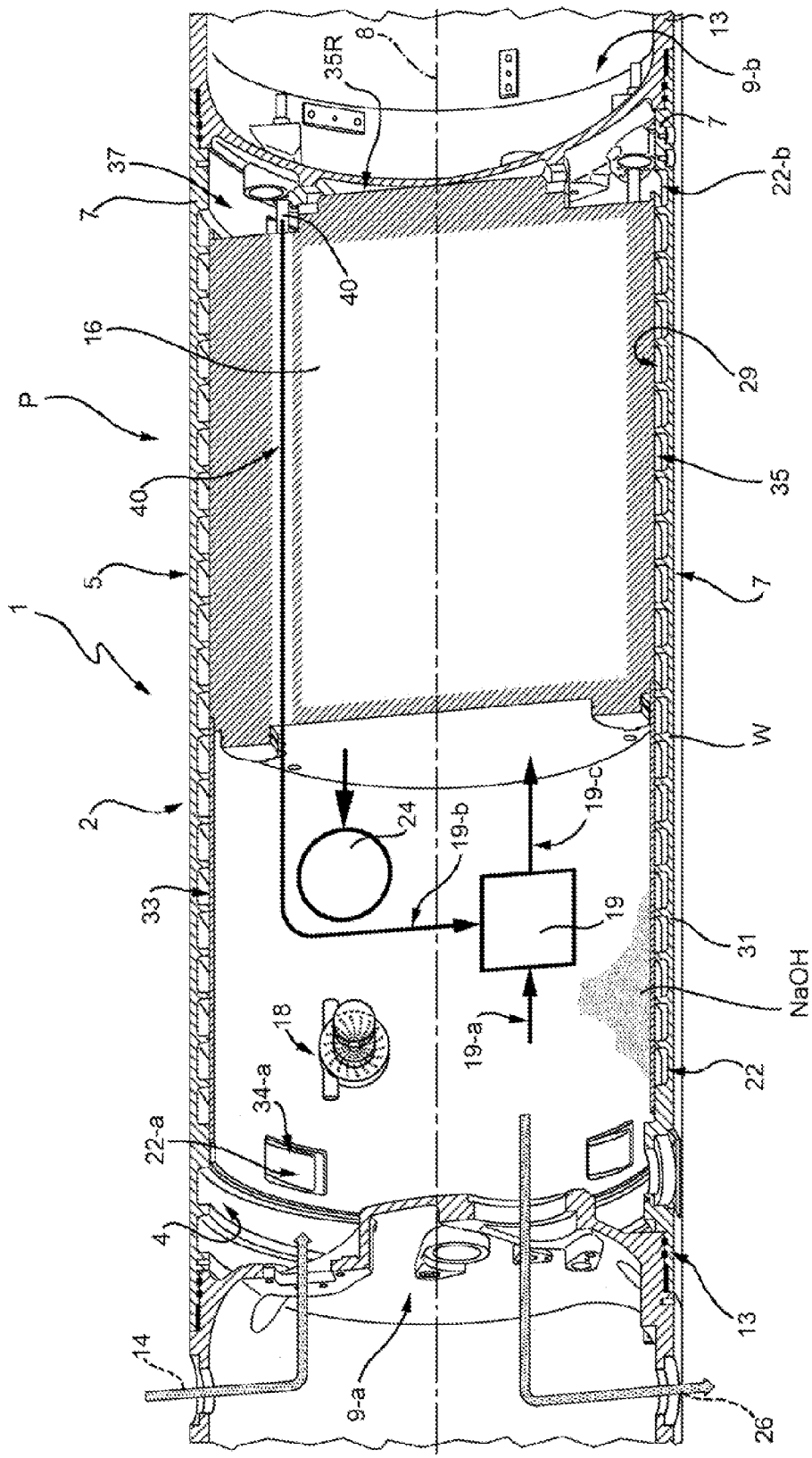
FIG. 2 shows an electric battery for the propulsion, in a marine environment, of an underwater vehicle produced according to the principles of the present invention.

In FIG. 2, reference numeral 1 indicates, as a whole, the power generator P, which, in the preferred embodiment described, is constituted by an electrochemical battery.

The battery 1 comprises a casing 2 that internally defines a main chamber 4 housing an anhydrous electrolyte, for example NaOH powder.

The casing 2 is externally delimited by the cylindrical tubular body 5 belonging to the load-bearing structure of the underwater vehicle S and is coaxial to axis 8.

The casing is further delimited by a first and a second partition wall 9-*a* and 9-*b*, which close the cylindrical tubular portion 5 at opposite ends. Typically, other partition walls 9-*a* and 9-*b* belong to other components of the torpedo S. Partition walls 9-*a* and 9-*b* have the shape of a portion of a spherical cap curving towards the inside of the main chamber 4. The connection between partition walls 9-*a* and 9-*b* and the cylindrical tubular portion 5 is implemented using opportune sealing means (for example, sealing rings 13) so as to provide a main chamber 4 completely watertight with respect to the marine environment that, in use, surrounds the torpedo.

The battery 1 is provided with intake members 14 to transfer a flow of water from the marine environment that surrounds the torpedo to the main chamber 4. These intake members 14 (of known type and therefore not described in further detail) are of the annually closed type and can open following a remote electric command to admit a flow of water into the main chamber 4 in such a way that the anhydrous electrolyte can mix with the water and form a liquid electrolyte.

The battery 1 houses a plurality of electrochemical cells 16 (of known type and therefore not described in further detail) housed, in modes that will described hereinafter, in the casing 2 inside the main chamber 4. The electrochemical cells 16 generate a DC output voltage used to power the motor M of the torpedo when a flow of electrolyte runs inside the cells.

The battery 1 also comprises a fluid recirculation system 18 (of known type and only partially shown) in which a pump creates high pressure (for example, 8 bar) on the fluid contained inside the main chamber. The fluid recirculation system 18 comprises a thermostatic mixing valve 19, which has a first inlet 19-*a* receiving pressurized fluid electrolyte coming from the main chamber 4, a second inlet 19-*b* connected to an output of the heat exchanger 20 and an outlet 19-*c* communicating with an inlet of the electrochemical cells 16.

Typically, the output of the electrochemical cells 16 communicates with a fluid phase/gas phase separator 24 that extracts the gases (mainly hydrogen $H_2$) from the electrolyte leaving the electrochemical cells 16, to transfer them to the outside of the torpedo through gas emission members 26 of known type and therefore not shown in detail. The hot electrolyte that leaves the separator 24 is readmitted into the main chamber 4.

Figure 4:
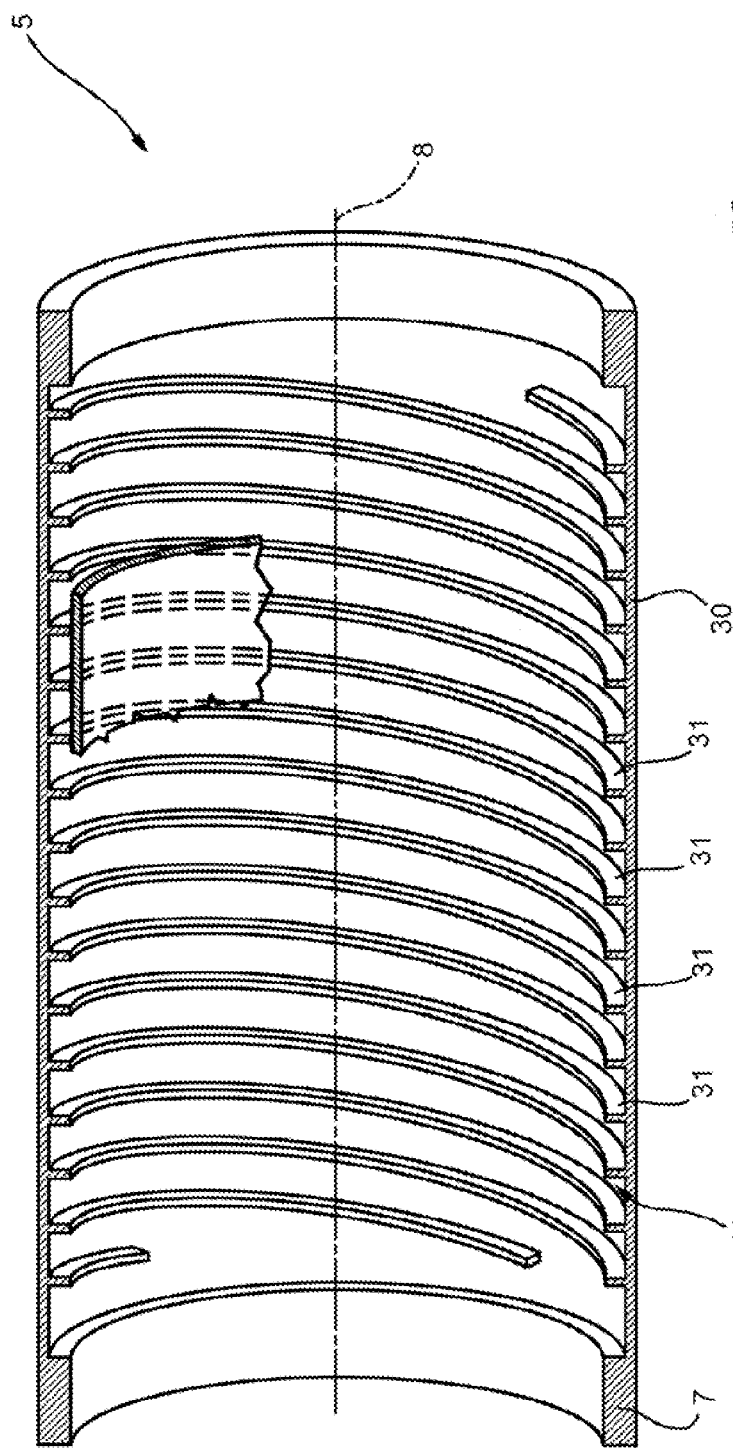

According to the present invention, the heat exchanger 20 is provided in the cylindrical tubular portion 5 and comprises at least one channel 22 made inside the cylindrical tubular wall 7 and delimited by ribs 31 that extend along a helical path coaxial to axis 8 (in this regard, see also FIG. 4). The channel 22 extends between a fluid inlet 22-*a* provided in close proximity to a first end of the cylindrical tubular portion 5 and a fluid outlet 22-*b* provided in close proximity to a second end of the cylindrical tubular portion 5. The helical layout (see also FIG. 4) allows providing a channel 22 that has a much longer length than that of the tubular portion 5, ensuring high thermal exchange between the fluid (electrolyte) that circulates in the channel 22 and the water that, in use, surrounds the cylindrical tubular portion 5. The temperature of the electrolyte that leaves the channel 22 is therefore significantly lower with respect to the temperature the electrolyte has at the inlet 22-*a* of the channel 22.

In the example shown, four channels 22 are provided (one inlet 22-*a* and outlet 22-*b* are shown in FIG. 4, the other inlet and outlet being on the opposite side and not shown) on the inside of wall 7 that forms the cylindrical tubular portion 5 and are axially separated with respect to one another; each channel 22 extends along a helical path coaxial to axis 8, which extends between a respective fluid inlet provided in close proximity to a first end of the cylindrical tubular portion 5 and a respective fluid outlet provided in close proximity to a second end of the cylindrical tubular portion 5.

In greater detail, each channel 22 comprises a groove 29 with a rectangular cross-section and rounded vertices following a circular profile. The groove 29 is made on an inner surface of the cylindrical tubular wall 7, open towards the inside of the cylindrical tubular portion and extending along the helical path coaxial, to axis 8, Each groove 29 is delimited by a flat base wall 30 coaxial to axis 8 and by two ribs 31 perpendicular to the base wall 30 and extending into the space with a helical profile coaxial to axis 8.

The battery 1 comprises a tubular sealing element 33 (conveniently made of a plastic or fibrous material, see FIG. 2) housed inside the cylindrical tubular wall 3 (the external diameter of the sealing element 33 is substantially equal to the internal diameter of the cylindrical tubular wall 7). The sealing element 33 is arranged with its entire length in contact with the cylindrical tubular wall 7, closing a first section of the grooves 29.

The electrochemical cells 16 are housed inside a cylindrical container 35 that has an external diameter equal to that of the tubular sealing element 33 to which it is contiguous. The cylindrical container 35 is housed inside the cylindrical tubular wall 7 (the external diameter of the cylindrical container 35 is substantially equal to the internal diameter of the cylindrical tubular wall 7) and is arranged with its entire length in contact with the cylindrical tubular wall 7, closing a second section of the grooves 29.

In a first section, the channel 22 is thus delimited by walls 30 and 31 and by a face of the lobular sealing element 33 facing the grooves 29 and, in a second section following and consecutive to the first, by walls 30 and 31 and by a face of the cylindrical container 35 facing the grooves 29.

The tubular sealing element 33 has, for each channel 22, a through opening 34-a communicating with a first end portion of the groove 29 and defining the fluid inlet 22-a of the channel 22 communicating with the main chamber 4.

The second end portions of the channels 22 open into an auxiliary chamber 37 arranged on the opposite end from the main chamber 4 with respect to the cylindrical container 35.

The auxiliary chamber 37 is delimited by a face 35f of the cylindrical container 35 transversal to axis 8, the cylindrical tubular wall 7 and wall 9b. The auxiliary chamber 37 receives the flow of electrolyte after the latter has terminated its path through the channels 22. For this reason, the temperature of the electrolyte in the auxiliary chamber 37 is significantly lower than that of the electrolyte in the main chamber 4.

A tube 40 extends parallel to axis 8 passing through the cylindrical container 35 and the main chamber 4; a first end of the tube 40 communicates with the auxiliary chamber 37 while a second end of the tube 40 communicates with the second inlet 19-b of the thermostatic valve 19.

Typically, the openings 34-a are parallelograms (for example, rectangles) with sides parallel to axis 8.

Figure 3:
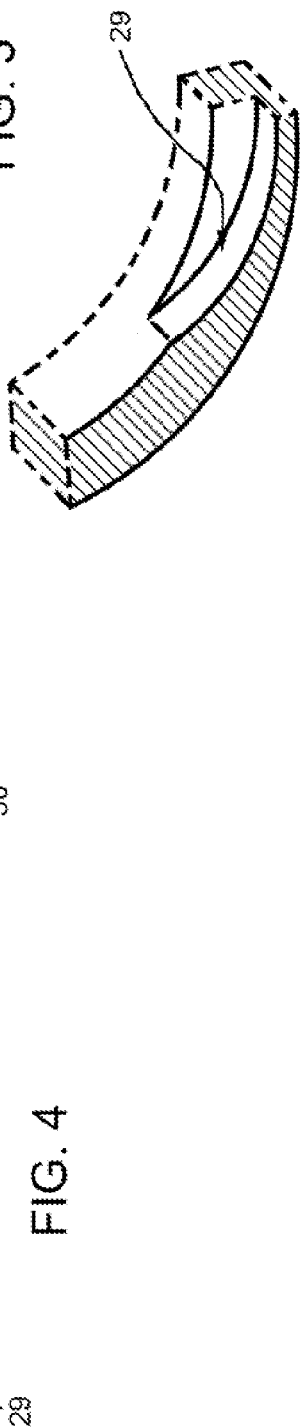
FIGS. 3 and 4 show some details of FIG. 2 on an enlarged scale.

Each groove 29 has a constant depth for substantially its entire length; only at the end portions of each groove zones 29 are transition zones provided (FIG. 3), in which the groove has a depth that progressively decreases from the maximum value to value close to zero, following a linear ramp. In this way, the creation of a stepped transition zone is avoided, the presence of which could weaken the cylindrical tubular wall. The ends of the grooves 29, respectively at the start and end of the heat exchanger 20, can only be terminated abruptly for lightly stressed structures. This solution facilitates manufacture of the structure.

Figure 5:
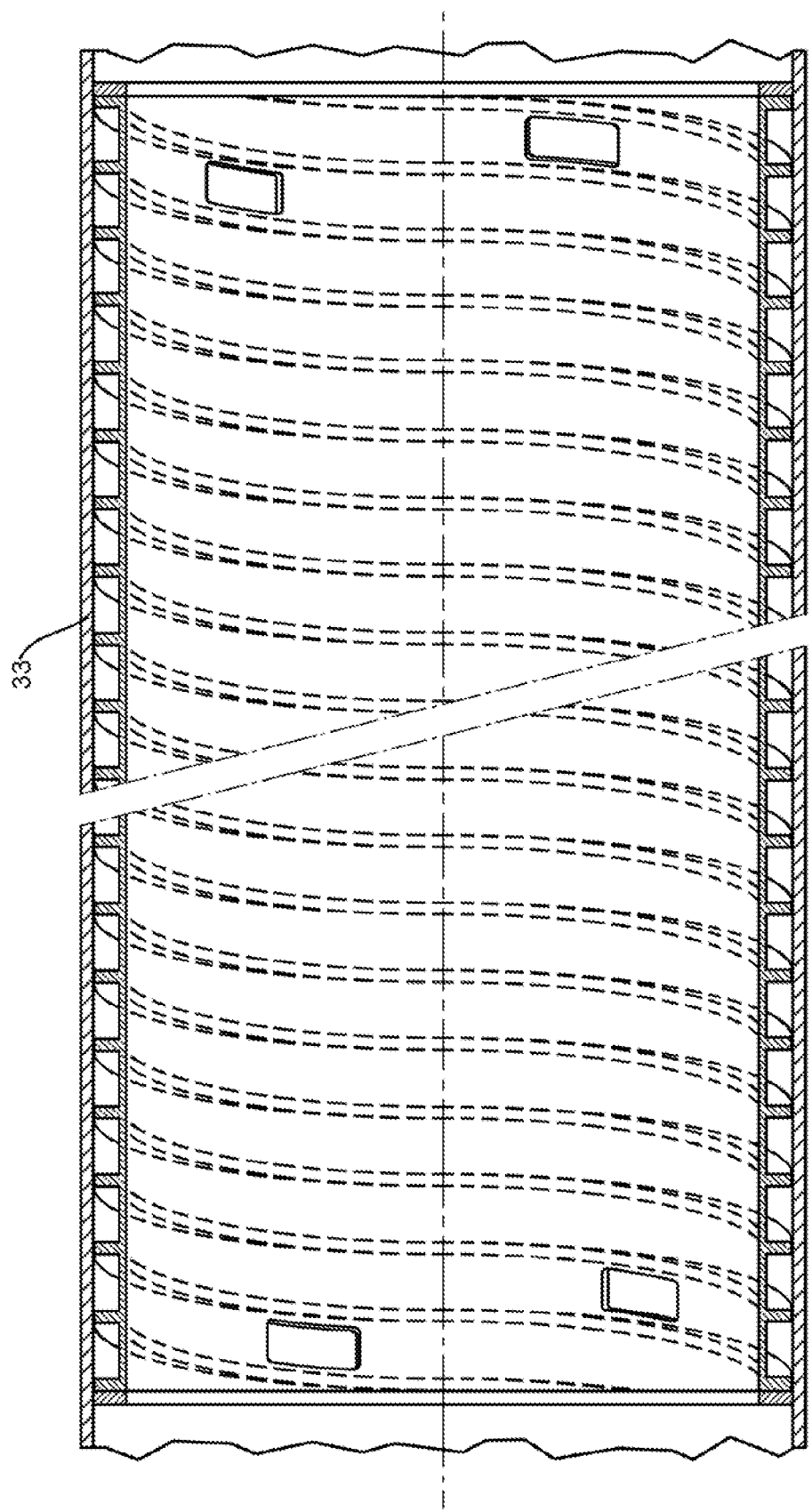
FIG. 5 shows a variant of that shown in FIG. 2.

Alternatively (FIG. 5), the groove 29 could be made on an outer surface of wall 7 of the tubular portion 5; in this case, the tubular sealing element 33 is mounted externally on the tubular portion 5 and arranged for its entire length in contact with the outer surface of wall 7, closing the groove (the internal diameter of the sealing element 33 is substantially equal to the external diameter of the cylindrical tubular wall 7).

In this way, the channel is delimited by the groove 29 and the tubular sealing element 33 arranged to close the side of the groove facing the outside of the tubular portion 5.

The invention claimed is:

1. An underwater vehicle comprising:
   a shaped casing elongated in an axial direction and designed to move in an underwater environment under a thrust of a propulsion system housed inside the shaped casing and powered by a power generator also housed inside the shaped casing,
   wherein the shaped casing comprises at least one tubular portion having a structural function; said tubular portion being lapped externally by seawater,
   said tubular portion defining at least one channel delimited by ribs that extend along a helical path coaxial to said axial direction, said channel extends along said helical path between a fluid inlet and a fluid outlet, said tubular portion forming a heat exchanger between fluid that flows in said channel and the seawater that laps an outside of said tubular portion.

2. An underwater vehicle according to claim 1, wherein said power generator comprises a battery provided in the tubular portion, comprising:
   a main chamber delimited by said tubular portion and housing an anhydrous electrolyte;
   intake members to transfer a flow of water from a marine environment to the main chamber, to form, following execution of a water-intake command, a liquid electrolyte;
   a plurality of electrochemical cells housed in the main chamber;
   a fluid recirculation system having a mixing valve that has a first inlet receiving fluid electrolyte coming from the main chamber, a second inlet communicating with an outlet of said heat exchanger receiving electrolyte taken from the main chamber as input, and an outlet communicating with an inlet of the electrochemical cells.

3. An underwater vehicle according to claim 2, wherein said tubular portion has, on an inner surface thereof, at least one groove that extends along said helical path, tubular sealing element housed inside said tubular portion and said tubular sealing element having an entire length in contact with said inner surface to close at least a first section of the groove, said channel being delimited, for at least a first section, by said groove and by said tubular sealing element arranged to close a side of the groove facing an inside of the tubular portion.

4. An underwater vehicle according to claim 1, wherein said tubular portion has, on an outer surface thereof, a groove that extends along said helical path, a tubular sealing element housed outside said tubular portion, said tubular sealing element having an entire length in contact with said outer surface to close the groove, said channel being delimited by said groove and by said tubular sealing element arranged to close the side of the groove facing the outside of said tubular portion.

5. An underwater vehicle according to claim 3, wherein said groove further comprises a second section of grooves, wherein said plurality of electrochemical cells are housed in a cylindrical container housed inside said tubular portion and arranged in contact with said inner surface to close said second section of the grooves, said channel being delimited, for a second section adjacent and consecutive to the first section, by said groove and by said cylindrical container arranged to close the side of said groove facing the inside of said tubular portion.

6. An underwater vehicle according to claim 2, wherein the fluid outlet of said channel communicates with an auxiliary chamber provided inside said tubular portion, arranged on the an opposite side with respect to said plurality of electrochemical cells with respect to said main chamber and adapted to contain cooled electrolyte, further comprising connection means extending from the auxiliary chamber to the main chamber for the return of the cooled electrolyte to said mixing valve.

7. An underwater vehicle according to claim 3, wherein said tubular sealing element has a first through opening communicating with a first end portion of said groove and defining the fluid inlet communicating with the main chamber.

8. An underwater vehicle according to claim 3, wherein said groove has a constant depth substantially for a whole of an extension of said groove, at end portions of said groove there being provided respective transition areas in which said groove has a depth that progressively decreases from a maximum value.

9. An underwater vehicle according to claim 8, wherein the decrease in depth of said groove is linear at said end portions.

10. An underwater vehicle according to claim 3, wherein said groove has a rectangular section.

11. An underwater vehicle according to claim 7, wherein said first through openings opening is elongated in the axial direction.

12. An underwater vehicle according to claim 1, wherein there are a plurality of channels provided in said tubular portion and axially separated with respect to one another by said ribs, each channel of said plurality of channels extends along a helical path coaxial to the axial direction of said tubular portion and extends between a respective fluid inlet and a respective fluid outlet.

* * * * *